(No Model.) 2 Sheets—Sheet 1.

F. A. JILLSON.
INDICATOR LOCK.

No. 361,294. Patented Apr. 19, 1887.

WITNESSES
F. L. Ourand.
A. C. Rawlings.

INVENTOR
Frank A. Jillson
by Steel & Underwood
Attorney (No Model.) 2 Sheets—Sheet 2.

F. A. JILLSON.
INDICATOR LOCK.

No. 361,294. Patented Apr. 19, 1887.

WITNESSES
F. L. Durand
A. C. Rawlings

INVENTOR
Frank A. Jillson
by Steel & Underwood
Attorney

UNITED STATES PATENT OFFICE.

FRANK A. JILLSON, OF RACINE, WISCONSIN.

INDICATOR-LOCK.

SPECIFICATION forming part of Letters Patent No. 361,294, dated April 19, 1887.

Application filed May 12, 1884. Serial No. 131,236. (No model.)

*To all whom it may concern:*

Be it known that I, FRANK A. JILLSON, of Racine, in the county of Racine, and in the State of Wisconsin, have invented certain new and useful Improvements in Indicator-Locks; and I do hereby declare that the following is a full, clear, and exact description thereof.

My invention relates to indicator-locks, and will be fully described hereinafter.

Figure 1:
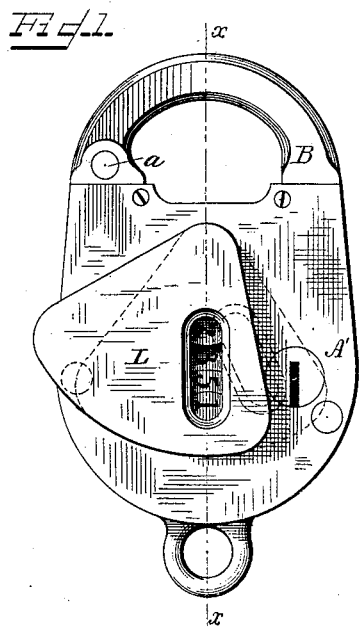
Figure 2:
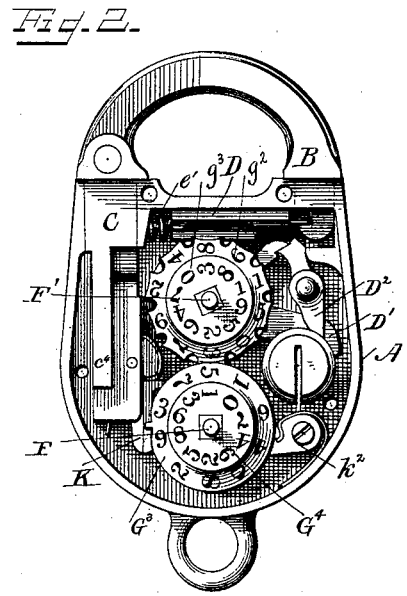
Figure 3:
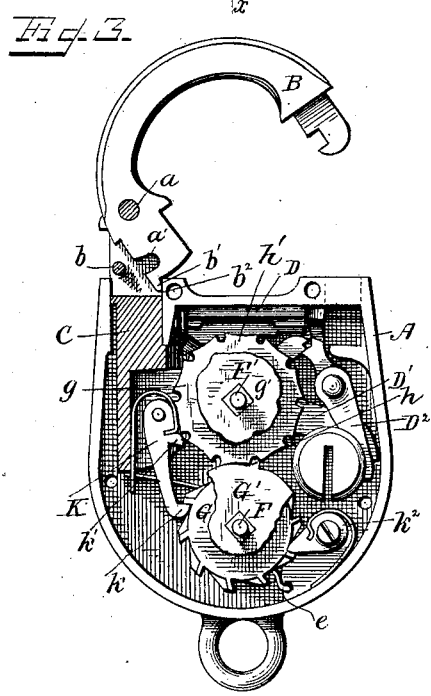
Figure 4:
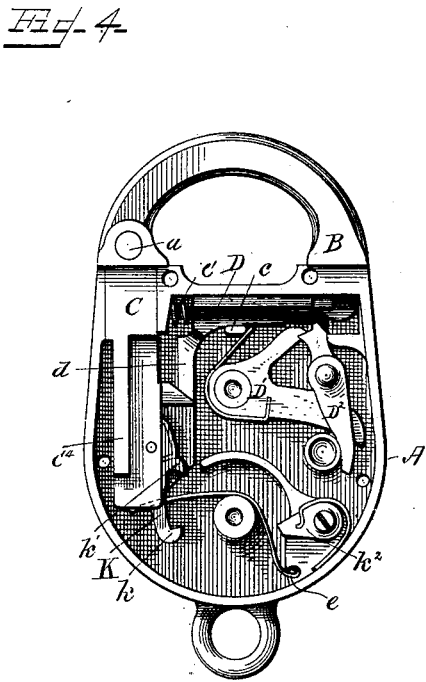
Figure 5:
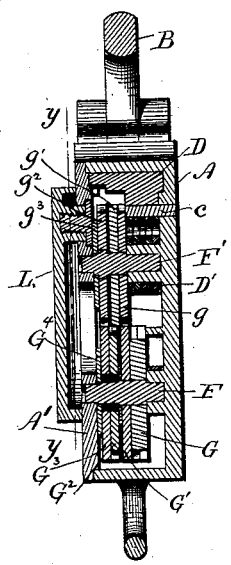
Figure 6:
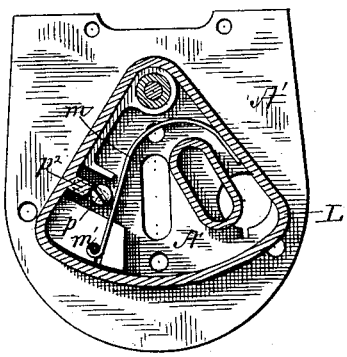
Figure 7:
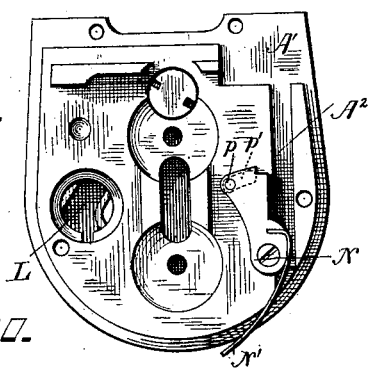
Figure 8:
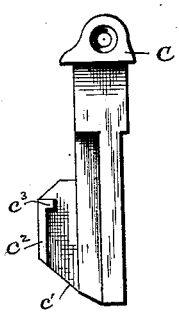
Figures 9, 10:
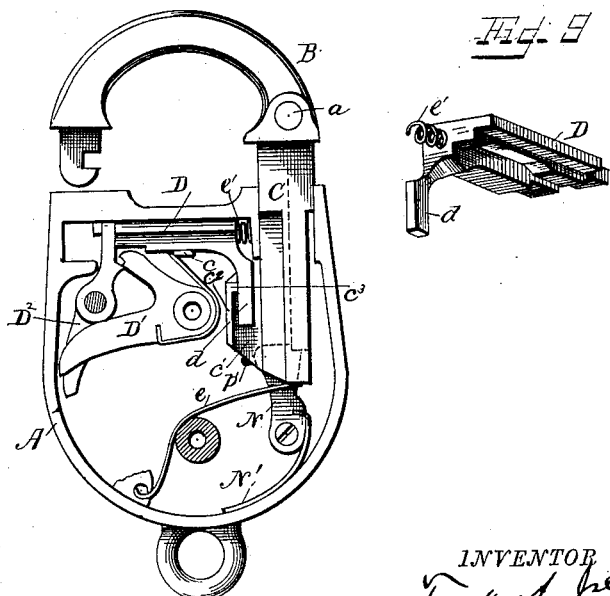

In the drawings, Figure 1 is a front view of a padlock embodying my invention. Fig. 2 is a like view of the same with the front plate removed. Fig. 3 is a like view to Fig. 2, with parts of the dials broken away and the lock open. Fig. 4 is a similar view with all the dials removed. Fig. 5 is a section on line X X, Fig. 1. Fig. 6 is a section on line Y Y, Fig. 5. Fig. 7 is an elevation of the inner side of the front plate. Figs. 8 and 9 are details, and Fig. 10 is a view with the back plate and dials removed.

A is the shell of my improved lock, and A' is its front plate.

B is the bail, and C is a slide, to which the bail B is pivoted at $a$. The upper end of slide C is bifurcated to receive the rear end of bail B, and a pin, $b$, is passed through the bifurcations to engage with a slot, $a'$, in the rear end of the bail, and thus prevent the latter from wedging against the adjacent edge of the shell when the lock is being closed. This pivot end of the bail is also provided with a lug, $b'$, that engages with the corner $b^2$ of the shell and limits the swing of the bail. The bail has the usual catch on its locking end, to receive a locking-bolt, D, that slides between the upper edge of the shell and a stud, $c$. The withdrawal of the bolt is accomplished by the lifts D', pawl-lever D², and a suitable key, which mechanism forms no part of my invention; but when the bolt D is unlocked and the bail drawn out, as shown in Fig. 3, to retain the bolt in its retracted position, I provide the latter with a dog, $d$, that projects down from and at about right angles to it, and to act in connection with this dog $d$, I provide the slide C with an offset, $c'$, and flange $c^2$, the latter having a shoulder, $c^3$, upon which the dog $d$ rests when the lock is closed; but when the bolt D is withdrawn the dog passes beyond the shoulder $c^3$, in position to pass behind the flange $c^2$ when the slide is forced out by spring $e$, and when this has occurred the bolt will be held back by the flange $c^2$ until the slide has been forced back into locking position, when the spring $e'$ will force the bolt D forward to cause its catch to engage with the catch on the bail and carry the dog $d$ over the shoulder $c^3$; hence when the bail is closed it is locked at both ends, and when it is open the bolt is held back, ready to admit the latch.

The indicating mechanism of my lock is constructed as follows:

F F' are axles that have bearings in the shell and front plate of the lock. The axle F carries, first, a ratchet-wheel, G, and a single-tooth wheel, G', which are integral both with each other and their axle, and, secondly, an interdentil wheel and superimposed single-tooth wheel, G² and G³, respectively, these two latter being integral with each other and loosely collared on the axle. The wheel G³ has numbers or letters on its face, and therefore serves as a dial, and upon this a small dial, G⁴, is placed and squared onto the axle so as to turn with it.

Axle F' has its bearings directly above those of axle F, and carries an interdentil wheel and single-tooth wheel, $g$ $g'$, respectively, all integral, and then upon the wheel $g'$, I place a loose interdentil dial, $g^2$, which in turn has placed upon it a small dial, $g^3$, which latter turns with its axle.

The ratchet-wheel G is connected with the slide C by a spring-pawl, K, which, engaging with one tooth of said wheel at a time, jigs it each time the lock is opened, and with it the single-tooth wheel G' and the small dial G⁴, and when the ratchet-wheel has been jigged a sufficient number of times to carry the wheel G' about its axis to the position in which its tooth $h$ will engage with the interdentil wheel $g$, its periphery in the meantime having traveled in the concave of one of the teeth of wheel $g$, the tooth $h$ will jig the interdentil wheel $g$ and the small dial above it just one tooth, and then will pass out of mesh, and then the periphery of wheel G' will turn against the concave crown of one of the teeth $h'$ of wheel $g$ until it (wheel G') has made another revolution, when it will again jig wheel $g$ until the latter has been turned sufficiently to bring the tooth of its superimposed wheel $g'$ into mesh with an interdentil wheel, G², that, with a single-tooth wheel, $G^3$, turns loosely on axle F, and the single-tooth wheel $G^3$ in turn at each revolution meshes with an interdentil (dial) wheel, $g^2$, that turns loosely on axle $F'$; hence by the back and forward action of this stop-gearing I get four changing figures, forming units, tens, hundreds, and thousands, a change being made every time the slide is drawn out to unlock the bail.

The pawl K has two catches, $k\ k'$, the catch $k$ serving to engage the front of a tooth on ratchet-wheel G when the slide is being withdrawn, and the tooth $k'$ serving to engage with the rear of a tooth when the slide is down in place, to prevent any backward turn of the wheel G. Another pawl, $k^2$, also serves to prevent the pawl K from turning the ratchet-wheel as the slide is being closed in.

The key-hole and opening through which the numbers are exhibited are covered normally by a guard, L, which is pivoted to the face-plate $A'$, and is held forward by a spring, $m$, that is secured at one end in a lug, $m'$, on the face-plate, its free end resting against the opposite flange of the guard L.

To get the key in its socket, it is necessary to move the guard L to the left, and for additional security I have pivoted a spring-pawl, N, to the inner side of the face-plate, in such a position that the tendency of its spring $N'$ will be to force it over the groove $A^2$ in the face-plate $A'$, and as this groove receives the rib $c^4$ of the slide C when the slide is withdrawn the pawl will spring under it and prevent the lock from being closed. Now, that this pawl may be carried out of the way of the rib at the proper time, I provide it with a lug, $p$, that extends through a slot, $p'$, in the face-plate $A'$, and a lug, $p^2$, on the guard L drops behind this lug $p$, so that when the guard is carried over the key-hole by its spring $m$ its lug $p^2$ also, by pressing against the lug $p$ of pawl N, will carry it out of the line of travel of slide C and permit the closing of the lock. This part of my invention I deem of great value, as it renders it impossible for any one to change the figures, except very slowly, in order to find the combination exhibited by the dials at the time that a lock has been feloniously opened. The key must be removed each time my lock is opened before it can be shut again.

Having thus described my invention, what I claim as new, and desire to secure by Letters Patent, is—

1. In an indicator-lock, a locking-bolt having a downwardly-projecting dog on its rear end, in combination with a slide to which the bail is pivoted, and an offset on said slide, which has a flange and shoulder for engagement with the dog of the locking-bolt, substantially as and for the purpose described.

2. The combination of the bail having lug $b'$ and slot $a'$ with the slide, its pin $b$, and the shell of the lock, as set forth.

3. The slide C and its offset, the latter flanged and shouldered, as described, in combination with the dog of the locking-bolt, and means for indicating each withdrawal of the slide, as set forth.

4. In an indicator-lock, a key-guard, in combination with the slide of the bail, and mechanism, substantially as described, connecting them, whereby the closing of the lock is prevented by the removal of the guard from over the key-hole, as described.

5. The combination, with the slide having rib $c^4$, of the key-guard, pawl N, spring $N'$, lugs $p$ and $p^2$, and face-plate having slot $p'$, as and for the purpose set forth.

6. The combination, with slide C and its pawl K, of indicating mechanism, a spring key-guard, and a pawl for locking the slide open when the guard is turned from over the key-hole.

In testimony that I claim the foregoing, I have hereunto set my hand, at Washington, in the District of Columbia, in the presence of two witnesses.

FRANK A. JILLSON.

Witnesses:
 JOHN W. SIMS,
 S. S. STOUT.